Feb. 9, 1937.  H. E. SWIFT  2,070,245
AUTOMOTIVE VEHICLE
Filed April 16, 1932  2 Sheets-Sheet 1
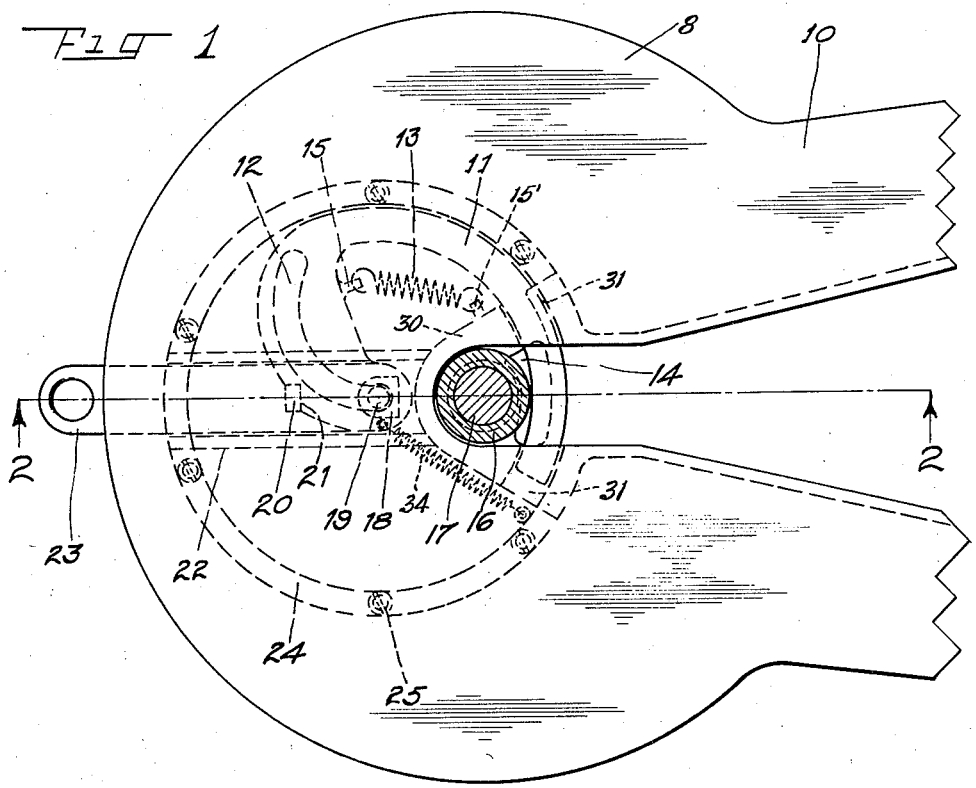
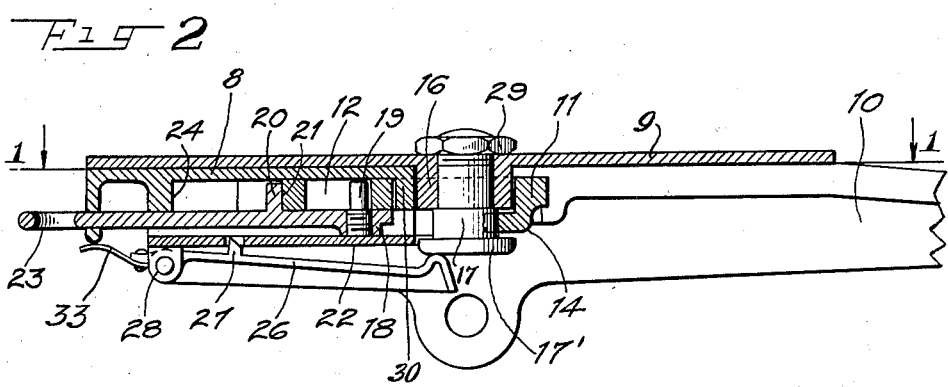
INVENTOR
Howard E. Swift
BY John D. Morgan
ATTORNEY Feb. 9, 1937.    H. E. SWIFT    2,070,245
AUTOMOTIVE VEHICLE
Filed April 16, 1932    2 Sheets-Sheet 2

INVENTOR
Howard E. Swift
BY John D. Morgan
ATTORNEY

Patented Feb. 9, 1937

2,070,245

UNITED STATES PATENT OFFICE 2,070,245

AUTOMOTIVE VEHICLE

Howard E. Swift, Westfield, Mass.

Application April 16, 1932, Serial No. 605,570

14 Claims. (Cl. 280—33.1)

The present invention relates to automotive vehicles and more particularly to a novel and improved locking device for securing the upper and lower fifth wheel members in cooperative relationship while a semi-trailer is coupled to its tractor.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a horizontal section taken on the line 1—1 of Figure 2 and shows the present illustrative embodiment of the invention;

Figure 2 is a central longitudinal section taken on the line 2—2 of Figure 1;

Figure 3:
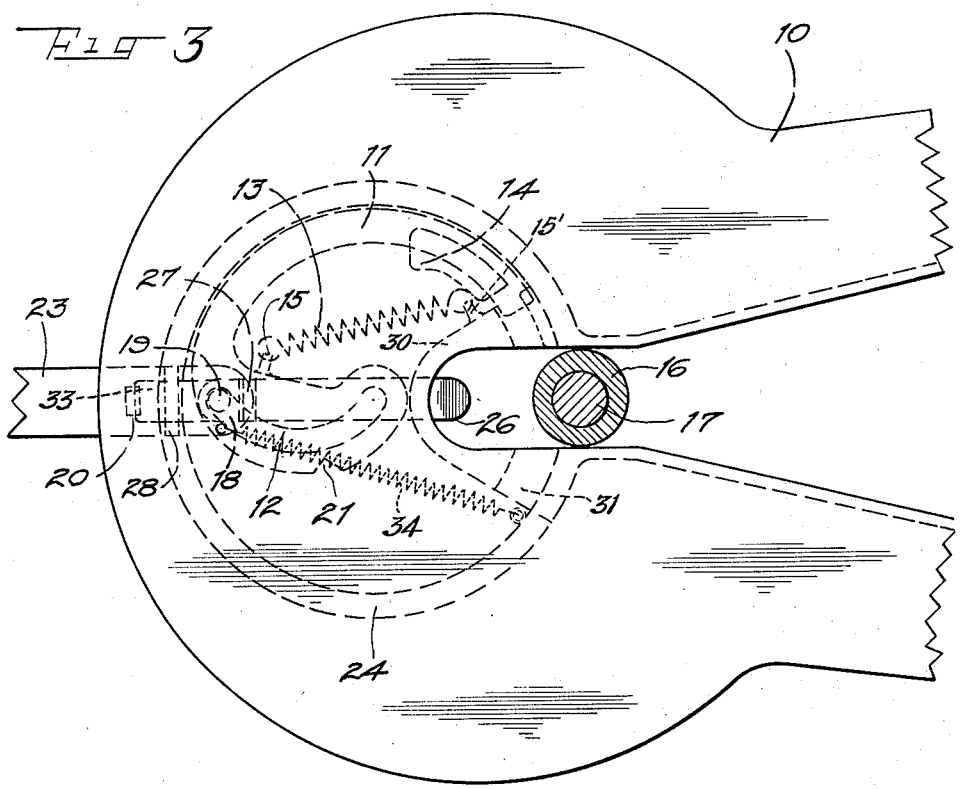
Figure 3 is a view similar to Figure 1 but showing the lock in unlocked and uncoupling position.

The present invention has for its object the provision of a novel and improved locking device for fifth wheels to be used in coupling tractors and semi-trailers. Another object is the provision of a fifth wheel locking device for securely holding the cooperative members of the fifth wheel together while permitting only relative rotation between them. A further object is the provision of a fifth wheel and lock therefor which can be manufactured economically and is simple and not likely to fail in operation. Still another object is the provision of a fifth wheel lock which is held in unlocked position while the semi-trailer is uncoupled and is automatically moved to locking position as the semi-trailer is correctly positioned for coupling.

In accordance with the present embodiment of the invention, the cooperating fifth wheel members comprise upper and lower circular plates or rings, one of which is provided with a projecting king pin, while the other is provided with a radial slot into which the king pin may be moved until the fifth wheel members are substantially concentric. The lock comprises an arcuate bolt which may be rotated to project it into and out of the slot and when projected into the slot closely confines the king pin and prevents any but rotational movement thereof. Associated with said arcuate bolt is a slidable bar, preferably manually operated, and connected to the arcuate bolt so that sliding movement of the bar is transformed into rotational movement of the bolt. Resilient means are provided for normally restoring the bolt to locking or slot-obstructing position and other means are provided for positively locking the bolt in its locked position. Means are also provided for releasably holding the bolt in open position and these means are preferably automatically released by the movement of the king pin and the fifth wheel member on which it is supported to trailer coupling position.

It will be understood that the foregoing general description and the following detailed description as well, are exemplary and explanatory of the invention but are not restrictive thereof.

Referring now in detail to the illustrative embodiment of the invention as shown in the accompanying drawings, the upper and lower fifth wheel members may be of substantially conventional construction and may be mounted on the tractor and semi-trailer in any desired manner. The upper fifth wheel member 9, to be carried by the forward end of the semi-trailer, comprises a circular disc or ring with a downwardly-projecting central boss 16 into which a king pin 17, having an enlarged head 17', is secured by nut 29. The lower fifth wheel member comprises a plate 8 of generally circular outline and provided with a pair of divergent ears 10 which project rearwardly of the tractor and may be downwardly and rearwardly inclined. The space between the ears 10 forms a rearwardly enlarged slot which serves to guide the king pin 17 into the central narrow portion thereof as the tractor is backed beneath the upper fifth wheel member.

On the under side of the lower fifth wheel member is formed a shallow cylindrical recess, bounded by wall 24, which has its center considerably in front of the coupled position of king pin 17, but preferably in line with the normal direction of pull along the tractor and semi-trailer. A downwardly extending web 30 is also provided on the lower fifth wheel member and serves to reinforce the fifth wheel near the king pin in its normal coupled position.

Figure 4:
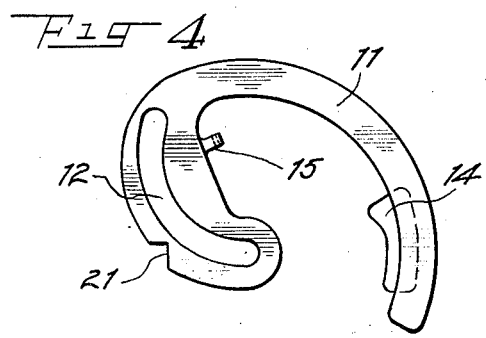
Figure 4 is a detail plan view of the locking bolt illustrated in the other figures.

The locking member, shown in plan in Figure 4, comprises an arcuate bolt 11, the outer face of which is of substantially the same curvature as the inner surface of wall 24 and is adapted to be moved through slots 31 formed in web 30, thereby securing the king pin in running position centrally of the lower fifth wheel member 8 and holding it against any but rotational movement.

Bolt 11 is adapted to be rotated to project it into and withdraw it from locking position (Figures 1 and 3 respectively), and for this purpose it is formed with a centrally-directed end portion and provided with a spiral slot 12 into which projects a stud 19 secured to bar 23. Bar 23 is longitudinally slidable in suitable guideways closed on their under side by plate 22, which is secured to wall 24 by screws 25 and serves to retain lubricant within the chamber formed thereby. Bar 23 may be connected with a cab on the tractor by a cable so as to be pulled forwardly to move the arcuate locking bolt to unlocked position when uncoupling.

Means are provided for returning the arcuate locking bolt 11 to locked position for running and for positively securing it in this position As embodied, a tension spring 13 is connected between lug 15 on bolt 11 and lug 15' on web 30. Bar 23 is formed with an upstanding lug 20 adapted to enter a notch 21 in bolt 11 and thereby prevent opening rotational movement of the bolt so long as bar 23 remains in its rearmost position. As soon, however, as the operator pulls bar 23 forwardly, the lug 20 is withdrawn from notch 21 and stud 19 can then cooperate with spiral slot 12 to move the bolt to the position shown in Fig. 3.

Means are also provided for holding the locking bolt 11 in unlocked or uncoupling position, and for maintaining it in this position so long as the semi-trailer is uncoupled from the tractor. For this purpose a lever 26, pivoted on the under side of the lower fifth wheel member by means of pin 28, extends rearwardly and is adapted to be depressed against the action of spring 33 by the enlarged head of king pin 17, when in coupled position. On its upper face, lever 26 is provided with a beveled lug 27 projecting upwardly through an aperture and adapted to engage the rear face of boss 18 when the bar 23 is pulled to its extreme forward position and king pin 17 is not in coupled position. Lug 27 holds the parts in this position until the rear end of lever 26 is depressed by movement of the king pin to coupling position, at which time it is released, allowing springs 13 and 34 to move bar 23 rearwardly and bolt 11 to locking position.

To limit upward movement of the king pin with respect to the lower fifth wheel member and thereby prevent uncoupling by such upward movement, the rear end of locking bolt 11 may be provided with a depending integral plate 14 for engagement with king pin 17 between the boss 16 and the enlarged head of the king pin.

For uncoupling, the operator need only pull the bar 23 forwardly to move bolt 11 to uncoupling position and releasably secure it in that position, while in coupling, the parts are automatically restored to locked position as soon as king pin 17 has been moved to its extreme forward position on the lower fifth wheel member 8, thereby indicating the proper relative positioning of the upper fifth wheel member with respect to the lower.

The invention in its broader aspects is not limited to the specific mechanisms shown and described but departures may be made therefrom within the scope of the accompanying claims without departing from the principles of the invention and without sacrificing its chief advantages.

What I claim is:—

1. A fifth wheel lock including in combination a pair of cooperating fifth wheel members, one having a projecting king pin and the other a slot along which the pin can be moved from coupled to uncoupled position and a rotatable locking bolt for obstructing the slot and having its pin engaging face concentric with the center about which the bolt is rotated.

2. A fifth wheel lock including in combination a pair of cooperating fifth wheel members, one having a projecting king pin and the other a slot along which the pin can be moved from coupled to uncoupled position, a rotatable locking bolt movable into and out of said slot to retain said pin therein, a spiral slot in said bolt and a longitudinally slidable pin cooperating with said spiral slot to rotate said bolt.

3. A fifth wheel lock including in combination a pair of cooperating fifth wheel members, one having a projecting king pin and the other a slot along which the pin can be moved from coupled to uncoupled position, a rotatable locking bolt normal to said slot and projectable therethrough to close said slot and secure the king pin against all but rotational movement, means normally tending to move the bolt to locking position, means for moving the bolt to open position and means for securing the bolt in locked position.

4. A fifth wheel lock including in combination a pair of cooperating fifth wheel members, one having a projecting king pin and the other a slot along which the pin can be moved from coupled to uncoupled position, an arcuate bolt having its geometrical center directly in advance of the king pin, and means for moving said bolt across said slot to secure the pin in coupled position.

5. A fifth wheel lock including in combination a pair of cooperating fifth wheel members, one having a projecting king pin and the other a slot along which the pin can be moved from coupled to uncoupled position, an arcuate bolt having its geometrical center directly in advance of said pin in coupled position, and adapted to cooperate with the inner end of said slot to form a socket closely limiting movement of the king pin, and means for retracting and projecting said bolt.

6. A fifth wheel lock including in combination a pair of cooperating fifth wheel members, one having a projecting king pin and the other a slot along which the pin can be moved from coupled to uncoupled position, an arcuate bolt to be projected into and out of said slot to secure said pin in one end of said slot and limit all but rotational movement thereof, a bar longitudinally slidable in said slotted member and means interconnecting said bolt and bar for rotating said bolt by movement of said bar.

7. A fifth wheel lock including in combination a pair of cooperating fifth wheel members, one having a projecting king pin and the other a slot along which the pin can be moved from coupled to uncoupled position, an arcuate bolt to be projected into and out of said slot to secure said pin in one end of said slot and limit all but rotational movement thereof, a bar longitudinally slidable in said slotted member, and means interconnecting said bolt and bar for rotating said bolt by movement of said bar, said bar and bolt being provided with a cooperating slot and pin.

8. A fifth wheel lock including in combination a pair of cooperating fifth wheel members, one having a projecting king pin and the other a slot along which the pin can be moved from coupled to uncoupled position, an arcuate bolt to be projected into and out of said slot to secure said pin in one end of said slot and limit all but rotational movement thereof, a bar longitudinally slidable in said slotted member, means interconnecting said bolt and bar for rotating said bolt by movement of said bar and means for releasably holding the bolt in unlocked position.

9. A fifth wheel lock including in combination a pair of cooperating fifth wheel members, one having a projecting king pin and the other a slot along which the pin can be moved from coupled to uncoupled position, an arcuate bolt to be projected into and out of said slot to secure said pin in one end of said slot and limit all but rotational movement thereof, a bar longitudinally slidable in said slotted member, means interconnecting said blot and bar for rotating said bolt by movement of said bar, and means releasably holding the bolt in unlocked position and for releasing said bolt automatically on coupling.

10. A fifth wheel lock including in combination a pair of cooperating fifth wheel members, one provided with a king pin, the other being slotted to receive the pin, a bolt slidable across said slot to retain said pin therein and an arcuate bolt to be projected into and out of said slot to secure said pin therein, a slidable bar, a spiral slot in said bolt and a pin projecting from said bar and into said spiral slot to rotate said bolt by sliding movement of said bar.

11. A fifth wheel construction for connecting a trailer and a motor vehicle together, including a depending king pin on the trailer, a bifurcated plate secured to the motor vehicle, a locking bar movable relative to the plate to extend across the bifurcation for locking the king pin to the plate, means on opposite sides of the bifurcation engaged by the locking bar when in locked position and sustaining the same against strains imposed thereon by the king pin in drawing the trailer, manual operable means for retracting the locking bar from its locked position, means for holding the same in its retracted position, means operable by contact with the king pin for freeing the locking bar from its retracted position, and means for automatically moving the same to lock the king pin in the bifurcation in the plate.

12. A fifth wheel lock including in combination a pair of cooperating fifth wheel members, one having a projecting king pin and the other a slot along which the pin can be moved from coupled to uncoupled position and a locking bolt for obstructing the slot, means supporting the bolt on both sides of the slot in coupled position, means for withdrawing the bolt to uncoupling position, resilient means for moving the bolt to coupled position and a releasable latch for holding the bolt in uncoupled position and released by coupling movement of the fifth wheel members.

13. A fifth wheel lock including in combination a pair of cooperating fifth wheel members, one having a projecting king pin and the other a slot along which the pin can be moved from coupled to uncoupled position and a locking bolt for obstructing the slot, a guideway in which the bolt slides, means for withdrawing the bolt to uncoupled position, resilient means for moving the bolt to coupled position and a releasable latch for holding the bolt in uncoupled position.

14. A fifth wheel including in combination a pair of cooperating fifth wheel members, one having a projecting king pin and the other a slot along which the pin can be moved during coupling or uncoupling of a semi-trailer, a locking bolt for obstructing the slot and holding the king pin in coupled position, a guideway in the slotted member in which the bolt slides, means for withdrawing the bolt to uncoupling position, resilient means for moving the bolt to coupled position, a releasable latch for holding the bolt in uncoupled position and released by engagement with the other fifth wheel member.

HOWARD E. SWIFT.